United States Patent [19]

Burke

[11] 4,158,945
[45] Jun. 26, 1979

[54] BRUSH CLEARING DEVICE

[76] Inventor: George A. Burke, 1401 Isabella Rd., Bakersfield, Calif. 93300

[21] Appl. No.: 809,801

[22] Filed: Jun. 24, 1977

[51] Int. Cl.² .............................................. A01D 49/00
[52] U.S. Cl. ........................................ 56/503; 56/295
[58] Field of Search ................. 56/294, 295, 503, 504, 56/13.6, 12.7

[56] References Cited

U.S. PATENT DOCUMENTS

| 1,870,932 | 8/1932 | Sternemann | 56/294 |
|---|---|---|---|
| 2,484,802 | 10/1949 | Aasland | 56/504 |
| 2,648,942 | 8/1953 | Grant et al. | 56/503 |
| 2,656,662 | 10/1953 | Hines | 56/12.7 |
| 2,941,347 | 6/1960 | Strom | 56/504 |
| 3,027,702 | 4/1962 | Phares | 56/504 |
| 3,208,207 | 9/1965 | Bottenberg | 56/13.6 |
| 3,531,924 | 10/1970 | Stine | 56/328 R |
| 3,556,422 | 1/1971 | Burkett | 56/503 |
| 3,715,874 | 2/1973 | Gosierud | 56/295 |
| 3,857,225 | 12/1974 | Knudson | 56/503 |
| 4,062,171 | 12/1977 | Rose | 56/295 |

FOREIGN PATENT DOCUMENTS

| 816422 | 7/1959 | United Kingdom | 56/504 |
|---|---|---|---|
| 1283550 | 7/1972 | United Kingdom | 56/503 |

Primary Examiner—Russell R. Kinsey
Assistant Examiner—Paul J. Hirsch
Attorney, Agent, or Firm—Edgar W. Averill, Jr.

[57] ABSTRACT

An apparatus for clearing brush by shredding or pulverizing the brush. The device has a pair of rotatable blade assemblies which are held in a frame. Each blade assembly has a plurality of blade-support shafts and one each shaft a plurality of bars are mounted. The blade assemblies are rotated and the tip of the blades on one blade assembly does not quite touch the tip of the blades on the other assembly.

10 Claims, 6 Drawing Figures

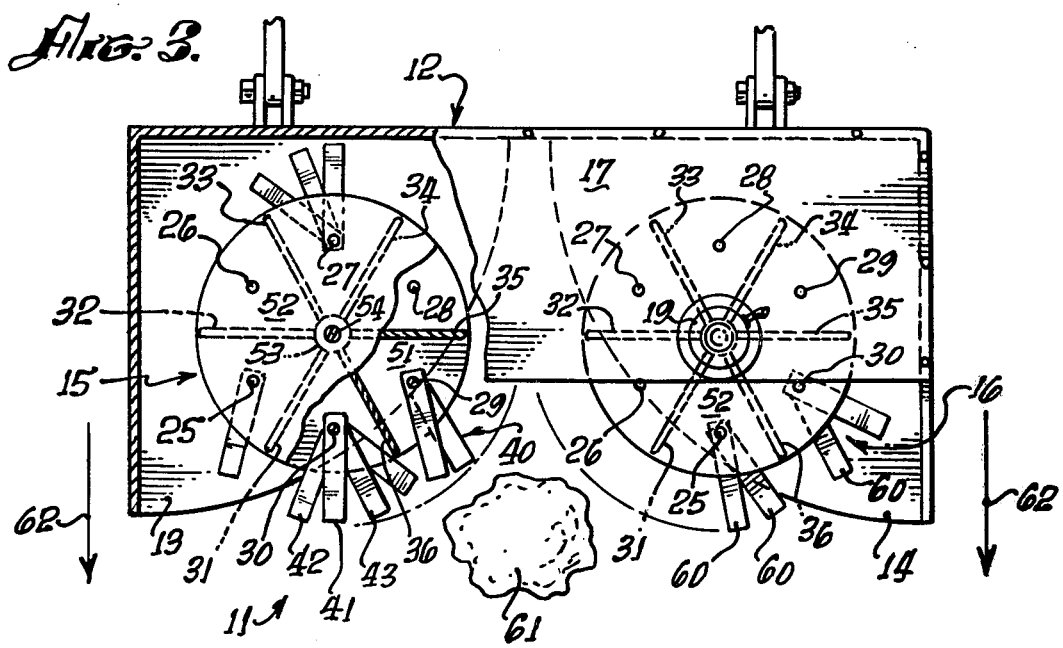
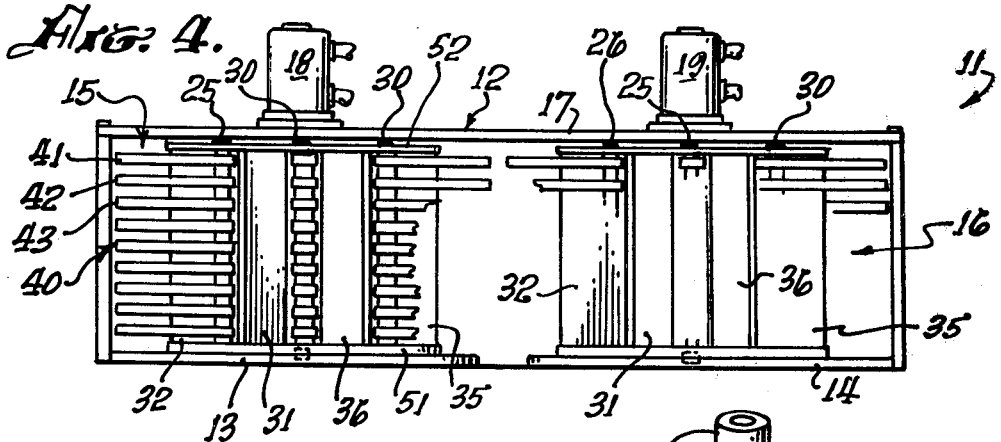
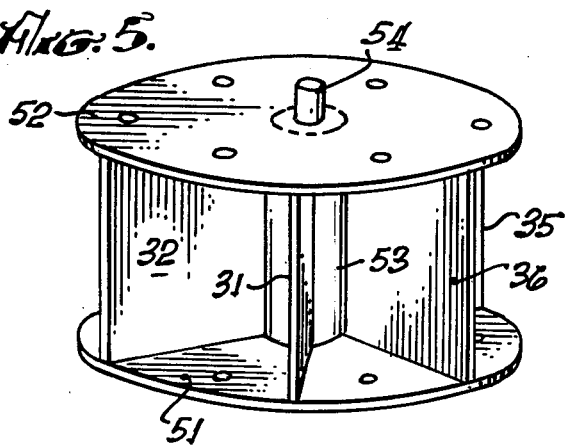
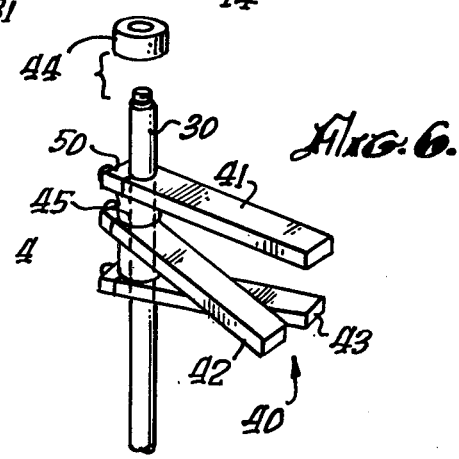

BRUSH CLEARING DEVICE

BACKGROUND OF THE DISCLOSURE

The clearing of brush-land to convert uncultivated acreage into farm-land has been a challenge for man since the very beginning of civilization. There are vast areas, particularly in the Western United States, which are covered with a relatively light growth of small trees such as pinon pine and juniper. When it is desired to covert such brushland to a more beneficial crop, such as alfalfa, rye grass or the like, it has been common practice to drag such areas with large chains which uproots the brush. The uprooted brush is then typically gathered into large piles and burned. With increased knowledge and understanding of the ecological damage caused by this method of clearing, there is need to provide a method for removing the brush which does not destroy insect and wild life native to the area.

Because of the high cost of cutting the brush by chain saws or other relatively high labor operations, an inexpensive and high volume method is needed. Such method should reduce the brush to a consistency that can be plowed into the ground or spread over the surface of the ground without the necessity of removal, burning or the like.

SUMMARY OF THE INVENTION

It is thus an object of the present invention to provide a device for clearing brush in sparsley overgrown areas which method does not require the burning or removal of the debris caused by the clearing.

It is another object of the present invention to provide a device which is capable of clearing a large area of brush in a relatively short period of time with a relatively small amount of labor.

The present invention is for a brush clearing device for pulvarizing and shredding brush thereby permitting it to be plowed into the ground. The apparatus has a lower frame supportable on a tractor. A pair of rotatable blade assemblies are mounted on bearings held by the frame. Each blade assembly has a lower support disc which holds a plurality of blade support shafts mounted generally perpendicular to the support disk. The support disk also holds a plurality of spacing means positioned between the blade support shafts. The blade support shafts are held at the upper end by an upper disk which is also held by a bearing affixed to the frame. Separating means are positioned between the blade support shafts to prevent the jamming of the blades on one shaft with those on an adjacent shaft. A plurality of cutting blades are pivotally mounted on each blade support shaft and when the blade support assembly is rotated, the cutter blades swing outwardly by centrifugal force. The two blade assemblies are mounted with the axis of rotation parallel to one another and are positioned so that the cutter blades of one assembly almost touch the cutter blades of the other assembly. The assemblies are rotated at a relatively high rate of speed and the blades are made with relatively high mass so that the device has a chipping, cutting and pulvarizing action and results the shredding of the brush.

BRIEF DESCRIPTION OF THE DRAWINGS

FIG. 3 is a plan view partly cut away of the brush shredding device of the present invention.

FIG. 4 is a side elevation of the apparatus of the present invention.

FIG. 5 is a perspective view of the support disks and spacer bars of the device of the present invention.

FIG. 6 is a perspective view of a portion of a blade support shaft having several blades mounted thereon.

DESCRIPTION OF THE PREFERRED EMBODIMENTS

Figure 1:
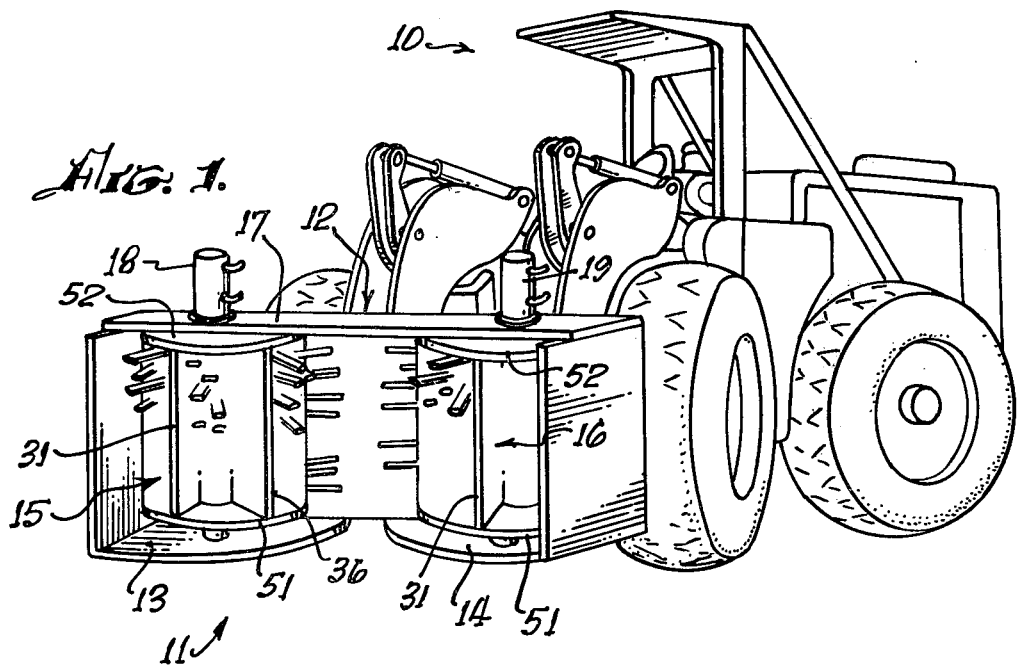
FIG. 1 is a perspective view of the brush clearing device of the present invention mounted on a tractor.

A tractor 10 supports a brush shredding device 11 and is equiped with hydraulic boom controls to raise, lower and tilt the brush shredding device 11. The tractor is of a conventional design typically used with a material handling bucket and equipped with a closed and pressurized hydraulic system.

The brush shredding device has a frame 12 which has two semicircular frame beds 13 and 14. Each frame bed holds a bearing such as a double roller bearing which should be preferably self-aligning for supporting the two cutter blade assemblies indicated generally by reference characters 15 and 16. The details of each blade assembly is shown more clearly in FIGS. 3 through 6.

Each blade assembly is also supported by an upper bearing held in the upper plate 17 of frame 12. Plate 17 should be removable for ease of disassembling the apparatus. Two hydraulic motors 18 and 19 serve to rotate the cutter blade assemblies and are powered by the hydraulic system of tractor 10. While hydraulic power is preferred over a chain or belt drive these latter means may be used. Alternatively, electric motors or other drive means could be used depending upon the source of power available from the tractor.

It is advantageous that the motors 18 and 19 be reversible so that in the event of a jamming, the direction of rotation can be reversed. Also for some types of brush different directions of rotation would be advantageous. For instance, for relatively light brush it is desirable that the blade assemblies be rotated so that the brush is pulled into the device. However, for a relatively heavy tree such inward movement could cause a jamming of the device and a reverse rotation would tend to chip and cut away at a heavier tree without resulting in any jamming. If the device is to be used exclusively on relatively light brush a single direction of rotation is possible. It has been found preferable to have the blades rotated in opposite direction although for some applications it is possible that the same direction of rotation could be used for each assembly.

The speed of rotation comprises an important aspect of the present invention. The present device works by a chipping action caused by a combination of high speed and heavy mass. Therefore, the blade assembly should be rotated at a speed such as 300 rpm and the cutter blades should be made of steel with the end tip hardened. Steel bars such two inch by six inch by two feet have been found useful and the blades are discussed in more detail with reference to FIG. 6.

The device of the present invention is shown in plan view in FIG. 3 where blade assembly 15 has six blade support shafts 25 through 30. Between each support shaft is a spacer bar indicated by reference characters 31 through 36. The spacer bars help to prevent the blades on one support shaft from becoming entangled with the blades on an adjacent support shaft. For instance, separating bar 31 helps prevent the blades supported by shaft 25 from becoming jammed against the blades held on shaft 30. A plurality of blades indicated by reference character 40 are held on each blade support shaft. The top three blades held on shaft 30 have been indicated by reference characters 41, 42 and 43 for clarity of description.

Turning now to FIG. 6 shaft 30 supports a plurality of blades, the upper three blades being indicated as 41, 42 and 43. A spacer 44 serves to hold adjacent blades apart and fits freely over shaft 30. Spacer 45 separates blades 41 and 42 and spacer 46 separates blades 42 and 43.

The blades may be held onto the shafts in various ways. It is advantageous that the blade be mounted in such a way that it may be replaced with relative ease. Thus, the blade may be divided in two parts at the shaft, the second part (such as 50) may be screwed into the main part of the blade 41. Thus, if blade 41 had to be replaced for any reason, part 50 could be removed and a new blade inserted over shaft 30 without the necessity of removing the shaft itself.

The support shafts are held by a pair of support discs 51 and 52 shown in FIG. 5. Discs 51 and 52 are held together with a central pipe 53 and by separating bars 31 through 36. A central shaft 54 is held at the bottom by a bearing, preferably a self-aligning double roller bearing and similarily is held by a roller bearing at the top. The shaft is rotated by a hydraulic motor 18 shown in FIG. 4. Hydraulic motors 18 and 19 are powered by the hydraulic system of the tractor and preferably are reversible to help prevent jamming and to assist in the action of the device for different size objects. Since blade assembly 16 is identical to blade assembly 15, the various elements of blade assembly 16 need not be labeled in the drawings in order to understand the present invention.

The blades 40 on each blade assembly tend to swing outwardly by centrifugal force when the blade assemblies are rotated. Blade assembly 15 is mounted with its axis of rotation parallel to the axis of rotation of blade assembly 16. It is also mounted so that the tips of the blades 40 do not touch the tips of the blades 60 on blade assembly 16. The tips of blades 40 should be separated by at least ⅛ of an inch and could be separated by as much as 2 inches but preferably should be spaced about ½ inch apart at their nearest point.

Figure 2:
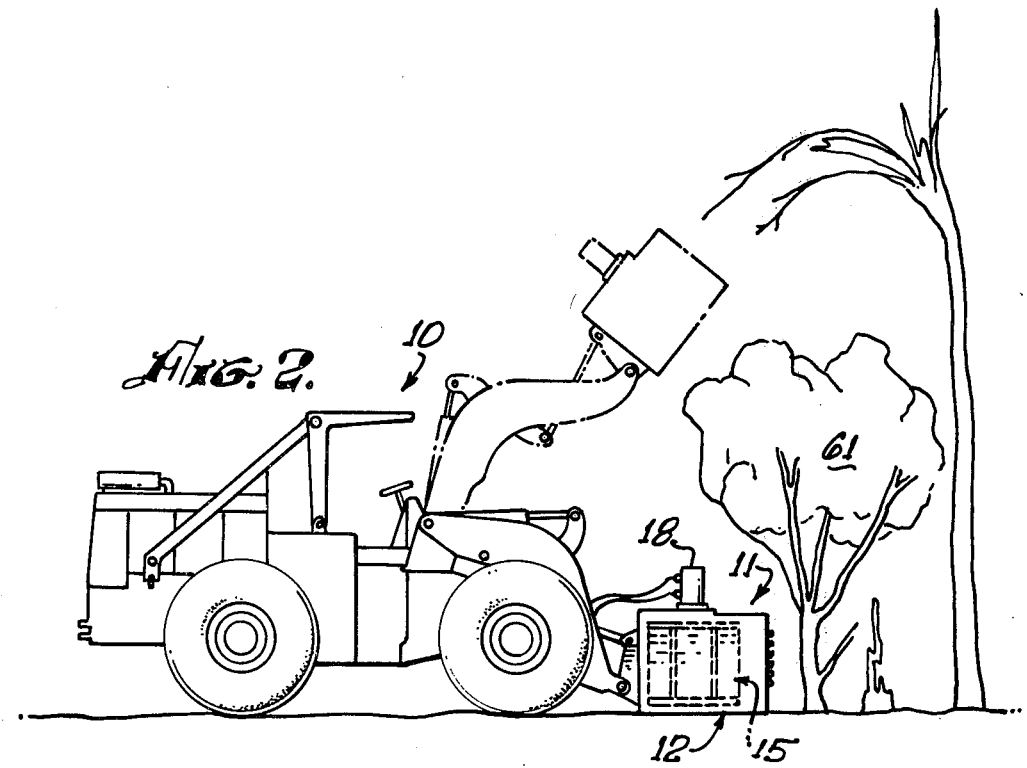
FIG. 2 is a side elevation of the device and tractor of FIG. 1.

As shown in FIG. 3, a tree 61 is being approached by brush shredding device 11. Blade assembly 15 is rotated in a counter-clockwise direction and blade assembly 16 is rotated in a clockwise assembly so that the tips of blade 40 are moving in the same direction as the tips of blade 60 at their closest point of intersection. As a blade 40 or 60 hits tree 61 it gouges a chunk out of the bark of the tree and tends to shred and pulvarize the tree as the device is moved in the direction of arrows 62. As shown in FIG. 2 for taller trees the device may be raised and tilted by tractor 10 and upper branches removed prior to shredding the tree trunk.

The device is capable of shredding materials down to a few inches from the ground level and thus permits ths complete clearing above the ground surface. For purposes of clearing power line right-of-ways, the ground could be sterilized immediately after clearing and no further operation would be necessary. Alternatively, a forege crop such as alfalfa or rye grass could be planted immediately after clearing.

It is contemplated that the device of the present invention would be of relatively high mass with a typical cutter blade size being two inches high, six inches wide and two feet long. The outer diameter of a blade assembly is preferably about ten feet from the tip of one blade to the tip of the opposite blade on the same assembly. The separating bars are preferably 1½ inch plate and the center pipe 53 is preferably a twelve inch pipe. The space between adjacent bars is preferably about two inches and the support shaft size should be about 2½ to three inches in outside diameter. The lower semicircular frame has a radius of about ten feet and should be fabricated from plate of about 1½ inch thickness. The upper plate 17 should be removable so that the blade assemblies could be removed for bearing replacement.

The speed of rotation will be dependent upon the particular size of device but with the device having approximate dimensions as set forth above, a rotation speed of approximately 300 rpm is anticipated. The number of blade support shafts may be varied but there should be at least three with four to six being preferable.

The number of blades on each blade support shaft will be dependent largely upon the size or height of the unit. For instance, if the blade assembly were four feet high, each blade support shaft would have twelve blades mounted thereon which is a preferably number. As few as four blades and as many as twenty blades are contemplated. It is, of course, contemplated that one or more shaft support members be welded from the center pipe 53 to reduce the effect of the centrifugal force caused by the turning of the blade assembly at a high rate of speed. The number of support shafts on each blade assembly should be at least three, with six being preferable.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. An apparatus for clearing brush by pulvarizing and shredding the brush thereby permitting it to be plowed into the ground, said apparatus comprising:

a lower frame supportable on a tractor;

a pair of rotatable blade assemblies, each of said blade assemblies being mounted on bearing means held on said frame and comprising a lower support disk rotatable with respect to the frame, said support disk holding a plurality of blade support shafts mounted generally perpendicular to said disk, said blade support shafts having a plurality of cutter blades pivotally mounted thereon and said disk further having a plurality of separating means positioned between said blade support shafts and positioned to prevent a blade mounted on one support shaft from becoming jammed against the blade on a adjacent shaft, an upper support disk affixed to the blade support shafts and to the separating means and held by bearing means to an upper portion of said frame, said blade assemblies having means for rotating said assemblies and each blade assembly being positioned so that the tips of the blades on one of assembly almost touch the tips of the blades on the other assembly;

said apparatus being free from a barrier which would prevent brush from entering the area between the two rotatable blade assemblies; and means for rotating said blade assemblies.

2. The device of claim 1 wherein each cutter bar is about two inches high, six inches wide and two feet long.

3. The device of claim 1 wherein adjacent blades on each support shaft are held apart by a spacer ring placed over the blade support shaft.

4. The device of claim 1 wherein said separating means is a plate mounted radially with respect to the axis of rotation of the blade assembly and affixed to said upper and lower support disks.

5. The device of claim 1 wherein there are at least three blade support shafts on each blade assembly.

6. The device of claim 1 wherein there are six blade support shafts on each blade assembly.

7. The device of claim 1 wherein each blade support shaft has between four and twenty cutter bars.

8. The device of claim 7 where each blade support shaft has about twelve blades thereon.

9. The device of claim 1 wherein each of said cutter bars has a hardened steel face on the end thereof.

10. The device of claim 1 wherein each blade assembly rotates in opposite directions and each rotates at a speed of about 300 rpm.

* * * * *